United States Patent
Chester (10) Patent No.: US 8,312,551 B2
(45) Date of Patent: Nov. 13, 2012

(54) LOW LEVEL SEQUENCE AS AN ANTI-TAMPER MECHANISM

(75) Inventor: David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 771 days.

(21) Appl. No.: 11/675,120

(22) Filed: Feb. 15, 2007

(65) Prior Publication Data
US 2008/0198832 A1    Aug. 21, 2008

(51) Int. Cl.
*H04L 29/06* (2006.01)

(52) U.S. Cl. ............ 726/26; 370/343; 713/181; 380/31; 380/34

(58) Field of Classification Search .................. 370/343; 726/22, 26
See application file for complete search history.

(56) References Cited

U.S. PATENT DOCUMENTS

| | | |
|---|---|---|
| 3,564,223 A | 2/1971 | Harris et al. |
| 4,095,778 A | 6/1978 | Wing |
| 4,646,326 A | 2/1987 | Backof, Jr. et al. |
| 4,703,507 A | 10/1987 | Holden |
| 4,893,316 A | 1/1990 | Janc et al. |
| 5,007,087 A | 4/1991 | Bernstein et al. |
| 5,048,086 A | 9/1991 | Bianco et al. |
| 5,077,793 A | 12/1991 | Falk et al. |
| 5,210,770 A | 5/1993 | Rice |
| 5,276,633 A | 1/1994 | Fox et al. |
| 5,297,153 A | 3/1994 | Baggen et al. |
| 5,297,206 A | 3/1994 | Orton |
| 5,319,735 A * | 6/1994 | Preuss et al. ................ 704/205 |
| 5,412,687 A | 5/1995 | Sutton et al. |
| 5,596,600 A | 1/1997 | Dimos et al. |
| 5,598,476 A | 1/1997 | LaBarre et al. |
| 5,646,997 A | 7/1997 | Barton |
| 5,677,927 A | 10/1997 | Fullerton et al. |

(Continued)

FOREIGN PATENT DOCUMENTS
EP    0 849 664 A2    6/1998
(Continued)

OTHER PUBLICATIONS
Bender et al., "Techniques for data hiding", 1996, IBM Systems Journal, vol. 35, pp. 313-336.*

(Continued)

*Primary Examiner* — Taghi Arani
*Assistant Examiner* — Thaddeus Plecha
(74) *Attorney, Agent, or Firm* — Fox Rothschild, LLP; Robert J. Sacco (57) ABSTRACT

A method is provided for tamper detection of a transmitted signal. The method is comprised of generating a first digital data signal having a first data rate. The method is also comprised of generating a second digital data signal having a second data rate. The method is further comprised of concurrently transmitting the first digital data signal at a first carrier frequency using a first modulation format and the second digital data signal at a second carrier frequency using a second modulation format. The method includes selecting the second carrier frequency and a bandwidth of the second digital data signal so that the second digital data signal is contained within a frequency spectrum defined by a bandwidth of the first digital data signal. The method also includes verifying an integrity of the first digital data signal at a remote receiver based on defection at the remote receiver of the second digital data signal. A system (100) is also provided for generating a tamper-protected transmitted signal.

20 Claims, 5 Drawing Sheets

U.S. PATENT DOCUMENTS

| | | | |
|---|---|---|---|
| 5,680,462 | A | 10/1997 | Miller et al. |
| 5,757,923 | A | 5/1998 | Koopman, Jr. |
| 5,811,998 | A * | 9/1998 | Lundberg et al. ............. 327/156 |
| 5,852,630 | A | 12/1998 | Langberg et al. |
| 5,900,835 | A | 5/1999 | Stein |
| 5,923,760 | A | 7/1999 | Abarbanel et al. |
| 5,924,980 | A | 7/1999 | Coetzee |
| 5,937,000 | A * | 8/1999 | Lee et al. ...................... 375/141 |
| 6,014,446 | A | 1/2000 | Finkelstein |
| 6,023,612 | A | 2/2000 | Harris et al. |
| 6,038,317 | A | 3/2000 | Magliveras et al. |
| 6,078,611 | A | 6/2000 | La Rosa et al. |
| 6,141,786 | A | 10/2000 | Cox et al. |
| 6,212,239 | B1 | 4/2001 | Hayes |
| 6,304,216 | B1 | 10/2001 | Gronemeyer |
| 6,304,556 | B1 | 10/2001 | Haas |
| 6,310,906 | B1 | 10/2001 | Abarbanel et al. |
| 6,314,187 | B1 | 11/2001 | Menkhoff et al. |
| 6,331,974 | B1 | 12/2001 | Yang et al. |
| 6,377,782 | B1 * | 4/2002 | Bishop et al. ................ 455/3.01 |
| 6,473,448 | B1 | 10/2002 | Shono et al. |
| 6,570,909 | B1 | 5/2003 | Kansakoski et al. |
| 6,614,914 | B1 * | 9/2003 | Rhoads et al. ................ 382/100 |
| 6,665,692 | B1 | 12/2003 | Nieminen |
| 6,732,127 | B2 | 5/2004 | Karp |
| 6,744,893 | B1 | 6/2004 | Fleming-Dahl |
| 6,754,251 | B1 | 6/2004 | Sriram et al. |
| 6,766,345 | B2 | 7/2004 | Stein et al. |
| 6,842,479 | B2 | 1/2005 | Bottomley |
| 6,842,745 | B2 | 1/2005 | Occhipinti et al. |
| 6,864,827 | B1 | 3/2005 | Tise et al. |
| 6,865,218 | B1 | 3/2005 | Sourour |
| 6,888,813 | B1 | 5/2005 | Kishi |
| 6,901,104 | B1 | 5/2005 | Du et al. |
| 6,937,568 | B1 | 8/2005 | Nicholl et al. |
| 6,980,656 | B1 | 12/2005 | Hinton, Sr. et al. |
| 6,986,054 | B2 | 1/2006 | Kaminaga et al. |
| 6,993,016 | B1 | 1/2006 | Liva et al. |
| 6,999,445 | B1 | 2/2006 | Dmitriev et al. |
| 7,023,323 | B1 * | 4/2006 | Nysen ........................... 340/10.1 |
| 7,027,598 | B1 | 4/2006 | Stojancic et al. |
| 7,035,220 | B1 | 4/2006 | Simcoe |
| 7,069,492 | B2 | 6/2006 | Piret et al. |
| 7,076,065 | B2 | 7/2006 | Sherman et al. |
| 7,078,981 | B2 | 7/2006 | Farag |
| 7,079,651 | B2 | 7/2006 | Den Boer et al. |
| 7,095,778 | B2 | 8/2006 | Okubo et al. |
| 7,133,522 | B2 | 11/2006 | Lambert |
| 7,170,997 | B2 | 1/2007 | Petersen et al. |
| 7,190,681 | B1 | 3/2007 | Wu |
| 7,200,225 | B1 | 4/2007 | Schroeppel |
| 7,233,969 | B2 | 6/2007 | Rawlins et al. |
| 7,233,970 | B2 | 6/2007 | North et al. |
| 7,245,723 | B2 | 7/2007 | Hinton, Sr. et al. |
| 7,269,198 | B1 | 9/2007 | Elliott et al. |
| 7,269,258 | B2 | 9/2007 | Ishihara et al. |
| 7,272,168 | B2 | 9/2007 | Akopian |
| 7,277,540 | B1 | 10/2007 | Shiba et al. |
| 7,310,309 | B1 | 12/2007 | Xu |
| 7,349,381 | B1 | 3/2008 | Clark et al. |
| 7,423,972 | B2 | 9/2008 | Shaham et al. |
| 7,529,292 | B2 | 5/2009 | Bultan et al. |
| 7,643,537 | B1 | 1/2010 | Giallorenzi et al. |
| 7,725,114 | B2 | 5/2010 | Feher |
| 7,779,060 | B2 | 8/2010 | Kocarev et al. |
| 7,830,214 | B2 | 11/2010 | Han et al. |
| 7,853,014 | B2 | 12/2010 | Blakley et al. |
| 7,929,498 | B2 | 4/2011 | Ozluturk et al. |
| 7,974,146 | B2 | 7/2011 | Barkley |
| 2001/0017883 | A1 | 8/2001 | Tiirola et al. |
| 2002/0012403 | A1 | 1/2002 | McGowan et al. |
| 2002/0034191 | A1 | 3/2002 | Shattil |
| 2002/0034215 | A1 | 3/2002 | Inoue et al. |
| 2002/0041623 | A1 | 4/2002 | Umeno |
| 2002/0054682 | A1 | 5/2002 | Di Bernardo et al. |
| 2002/0099746 | A1 | 7/2002 | Tie et al. |
| 2002/0110182 | A1 | 8/2002 | Kawai |
| 2002/0115461 | A1 | 8/2002 | Shiraki et al. |
| 2002/0122465 | A1 | 9/2002 | Agee et al. |
| 2002/0128007 | A1 | 9/2002 | Miyatani |
| 2002/0172291 | A1 | 11/2002 | Maggio et al. |
| 2002/0174152 | A1 | 11/2002 | Terasawa et al. |
| 2002/0176511 | A1 | 11/2002 | Fullerton et al. |
| 2002/0186750 | A1 | 12/2002 | Callaway et al. |
| 2003/0007639 | A1 | 1/2003 | Lambert |
| 2003/0016691 | A1 | 1/2003 | Cho |
| 2003/0044004 | A1 | 3/2003 | Blakley et al. |
| 2003/0156603 | A1 | 8/2003 | Rakib et al. |
| 2003/0182246 | A1 | 9/2003 | Johnson et al. |
| 2003/0198184 | A1 | 10/2003 | Huang et al. |
| 2004/0001556 | A1 | 1/2004 | Harrison et al. |
| 2004/0059767 | A1 | 3/2004 | Liardet |
| 2004/0092291 | A1 | 5/2004 | Legnain et al. |
| 2004/0100588 | A1 | 5/2004 | Hartson et al. |
| 2004/0146095 | A1 | 7/2004 | Umeno et al. |
| 2004/0156427 | A1 | 8/2004 | Gilhousen et al. |
| 2004/0161022 | A1 | 8/2004 | Glazko et al. |
| 2004/0165681 | A1 | 8/2004 | Mohan |
| 2004/0196212 | A1 * | 10/2004 | Shimizu ........................ 345/3.1 |
| 2004/0196933 | A1 | 10/2004 | Shan et al. |
| 2005/0004748 | A1 | 1/2005 | Pinto et al. |
| 2005/0021308 | A1 | 1/2005 | Tse et al. |
| 2005/0031120 | A1 | 2/2005 | Samid |
| 2005/0050121 | A1 | 3/2005 | Klein et al. |
| 2005/0075995 | A1 | 4/2005 | Stewart et al. |
| 2005/0089169 | A1 | 4/2005 | Kim et al. |
| 2005/0129096 | A1 | 6/2005 | Zhengdi et al. |
| 2005/0207574 | A1 | 9/2005 | Pitz et al. |
| 2005/0249271 | A1 | 11/2005 | Lau et al. |
| 2005/0259723 | A1 | 11/2005 | Blanchard |
| 2005/0265430 | A1 | 12/2005 | Ozluturk et al. |
| 2005/0274807 | A1 * | 12/2005 | Barrus et al. ............. 235/462.25 |
| 2006/0072754 | A1 | 4/2006 | Hinton et al. |
| 2006/0088081 | A1 | 4/2006 | Withington et al. |
| 2006/0093136 | A1 | 5/2006 | Zhang et al. |
| 2006/0123325 | A1 | 6/2006 | Wilson et al. |
| 2006/0209926 | A1 | 9/2006 | Umeno et al. |
| 2006/0209932 | A1 | 9/2006 | Khandekar et al. |
| 2006/0251250 | A1 | 11/2006 | Ruggiero et al. |
| 2006/0264183 | A1 | 11/2006 | Chen et al. |
| 2007/0098054 | A1 | 5/2007 | Umeno |
| 2007/0121945 | A1 | 5/2007 | Han et al. |
| 2007/0149232 | A1 | 6/2007 | Koslar |
| 2007/0201535 | A1 | 8/2007 | Ahmed |
| 2007/0230701 | A1 | 10/2007 | Park et al. |
| 2008/0008320 | A1 | 1/2008 | Hinton et al. |
| 2008/0016431 | A1 | 1/2008 | Lablans |
| 2008/0075195 | A1 | 3/2008 | Pajukoski et al. |
| 2008/0080439 | A1 | 4/2008 | Aziz et al. |
| 2008/0084919 | A1 | 4/2008 | Kleveland et al. |
| 2008/0095215 | A1 | 4/2008 | McDermott et al. |
| 2008/0198832 | A1 | 8/2008 | Chester |
| 2008/0263119 | A1 | 10/2008 | Chester et al. |
| 2008/0294707 | A1 | 11/2008 | Suzuki et al. |
| 2008/0294710 | A1 | 11/2008 | Michaels |
| 2008/0294956 | A1 | 11/2008 | Chester et al. |
| 2008/0304553 | A1 | 12/2008 | Zhao et al. |
| 2008/0304666 | A1 | 12/2008 | Chester et al. |
| 2008/0307022 | A1 | 12/2008 | Michaels et al. |
| 2008/0307024 | A1 | 12/2008 | Michaels et al. |
| 2009/0022212 | A1 | 1/2009 | Ito et al. |
| 2009/0034727 | A1 | 2/2009 | Chester et al. |
| 2009/0044080 | A1 | 2/2009 | Michaels et al. |
| 2009/0059882 | A1 | 3/2009 | Hwang et al. |
| 2009/0110197 | A1 | 4/2009 | Michaels |
| 2009/0122926 | A1 | 5/2009 | Azenkot et al. |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1 | 11/2009 | Michaels et al. |
| 2009/0285395 | A1 | 11/2009 | Hu et al. |
| 2009/0296860 | A1 | 12/2009 | Chester et al. |
| 2009/0300088 | A1 | 12/2009 | Michaels et al. |
| 2009/0309984 | A1 | 12/2009 | Bourgain et al. |
| 2009/0310650 | A1 | 12/2009 | Chester et al. |
| 2009/0316679 | A1 | 12/2009 | Van Der Wateren |

| | | | |
|---|---|---|---|
| 2009/0323766 | A1 | 12/2009 | Wang et al. |
| 2009/0327387 | A1 | 12/2009 | Michaels et al. |
| 2010/0030832 | A1 | 2/2010 | Mellott |
| 2010/0054225 | A1 | 3/2010 | Hadef et al. |
| 2010/0111296 | A1 | 5/2010 | Brown et al. |
| 2010/0142593 | A1 | 6/2010 | Schmid |
| 2010/0254430 | A1 | 10/2010 | Lee et al. |
| 2010/0260276 | A1 | 10/2010 | Orlik et al. |
| 2011/0222393 | A1 | 9/2011 | Kwak et al. |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2005017612 A | 1/2005 |
| WO | WO-0135572 A2 | 5/2001 |
| WO | WO-2006 110954 | 10/2006 |
| WO | WO 2008065191 | 6/2008 |
| WO | WO-2008099367 A2 | 8/2008 |
| WO | WO-2008130973 A1 | 10/2008 |
| WO | WO 2009146283 | 12/2009 |

OTHER PUBLICATIONS

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Barile, Margherita, "Bijective," From MathWorld—A Wolfram Web Resource, created by Eric W. Weisstein. http://mathworld.wolfram.com/Bijective.html.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Morsche, et al., "Signals and Systems," lecture notes, University of Eindhoven, The Netherlands, 1999.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html.

Weisstein, Eric W. "Surjection," From MathWorld—A Wolfram Web Resource, http://mathworld.wolfram.com/Surjection.html.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/056,024, filed Mar. 26, 2008, entitled "Selective Noise Cancellation of a Spread Spectrum Signal".

Michaels, et al., U.S. Appl. No. 12/117,086, filed May 8, 2008, Entitled "Cryptographic System Including a Mixed Radix Number Generator With Chosen Statistical Artifacts".

Chester, et al., U.S. Appl. No. 12/116,104, filed May 6, 2008, Entitled, "A Closed Galois Field Cryptographic System".

Chester, et al., U.S. Appl. No. 12/131,386, filed Jun. 2, 2008, Entitled "Adaptive Correlation".

Chester, et al., U.S. Appl. No. 12/137,593, filed Jun. 12, 2008, entitled "Featureless Coherent Chaotic Amplitude Modulation".

Michaels, et al., U.S. Appl. No. 12/129,197, filed May 29, 2008, entitled "Digital Generation of an Accelerated or Decelerated Chaotic Numerical Sequence".

Michaels, et al., U.S. Appl. No. 12/129,654, filed May 29, 2008, entitled "Sine/Cosine Generator".

Michaels, et al., U.S. Appl. No. 12/496,214, filed Jul. 1, 2009, entitled "Anti-Jam Communications Having Selectively Variable Papr Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based Tdma Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "AD-HOC Network Acquisition Using Chaotic Sequence Spread Waveform".

Michaels, Alan, U.S. Appl. No. 12/201,021, filed Aug. 29, 2008, entitled "Multi-Tier AD-HOC Network Communications".

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.

Nakamura, et al, "Chaotic synchronization-based communications using constant envelope pulse" Electrical Engineering in Japan, [Online] vol. 163, No. 3, Feb. 12, 2008 , pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Salberg, et al, "Stochastic multipulse—PAM: A subspace modulation technique with diversity" Signal Processing, Elsevier Science Publishers B.V. Amsterdam, NL, vol. 83, No. 12, Dec. 1, 2003, pp. XP004467986; ISSN: 0165-1684.

Bererber, S.M., et al., "Design of a CDMA Sysetm in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Soobul, Y., et al. "Digital chaotic coding and modulation in CDMA" IEEE AFRICON Oct. 2, 2002, Oct. 4, 2002, pp. 841-846, XP002575052 Retrieved from the Internet: URL:http://ieeexplore.ieee.org> [retrieved on Mar. 23, 2010].

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA,IEEE, Mar. 16, 2004, pp. __1-1__1, XP010715117 ISBN: 978-977-5031-77-8.

Rabiner, Lawrence R., "A Tutorial on Hidden Markov Models and Selected Applications in Speech Recognition", Proceedings of the IEEE, vol. 77, No. 2, Feb. 1989.

Aparicio; Communications Systems Based on Chaos, May 2007. Universidad Rey Juan Carlos.

Taylor, F.J., "Residue Arithmetic A Tutorial with Examples", Computer, vol. 17, No. 5, pp. 50-62, May 1984, doi: 10.1109/MC. 1984.1659138.

Barda, A; et al., "Chaotic signals for multiple access communications," Electrical and Electronics Engineers in Israel, 1995, Eighteenth Convention of, Vol., no., pp. 2.1.3/1-2.1/3/5, Mar. 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.

Information about Related Patents and Patent Applications, see section 6 of the accompanying Information Disclosure Statement Letter, which concerns Related Patents and Patent Applications.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

Popescu, Angel, A Galois Theory for the Field Extension K ((X))/K., Glasgow Mathematical Journal; Sep. 2010, vol. 52 Issue 3, p. 447-451, 5p.

Pirkin, Ilya, Calculations in Galois Fields., C/C++ Users Journal; Oct. 2004, vol. 22 Issue 10, p. 14-18, 4p, 1 Color Photograph.

Diaz-Toca, G.M. and Lombardi, H. , Dynamic Galois Theory., Journal of Symbolic Computation; Dec. 2010, vol. 45 Issue 12, p. 1316-1329, 14p.

Socek, D., et al., Short Paper: Enhanced 1-D Chaotic Key Based Algorithm for Image Encryption, Sep. 2005, IEEE.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

Office Action issued in Japanese Patent Application No. 2010-504206 in the name of Harris Corporation; mailed Jan. 6, 2012.

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Boyar, "Inferring Sequences Produce by Pseudo-Random Number Generators", Journal of the Associate for Computing Machine, vol. 36, No. 1, pp. 20-41, 1989.

Bender, et al., "Techniques for data hiding", 1995, IBM Systems Journal, vol. 35, pp. 313-336.

\* cited by examiner

LOW LEVEL SEQUENCE AS AN ANTI-TAMPER MECHANISM

BACKGROUND OF THE INVENTION

1. Statement of the Technical Field

The invention concerns wireless communications networks and systems. More particularly, the invention concerns an anti-tamper method and apparatus for a communications link.

2. Description of the Related Art

Electronic security systems often rely on remote sensors which communicate data back to a central monitoring location. These systems generally make use of some type of communication link from the remote sensor to the central monitoring location. In recent years, wireless technologies have become more common for the purpose of implementing this communication link. However, with an evolution of data transport from wired to wireless, the potential for circumvention of such systems is increasing. In particular, the wireless data link presents an opportunity to interfere with, modify, or substitute bogus sensor data for actual sensor data. Many tamper protection methods exist to foil such activities. For example, some video surveillance systems utilize hardware and software configured to mark each frame of video data with a timestamp and/or a frame number. The video data with a timestamp and/or a frame number is transmitted wirelessly from a source communications device to a destination communications device. At the destination communications device, an anti-tamper check processing is performed on the video data. This processing involves determining a difference between a set of timestamps and/or frame numbers. Subsequently, a comparison is made between the difference value and a known threshold value. If the difference value is greater than the threshold value, the video data has been compromised.

Despite the tamper protection benefits provided by this method, it suffers from certain drawbacks. For example, an unauthorized individual can easily intercept a transmission of authentic video data and substitute bogus video data. For example, one or more frame time-stamps and/or frame numbers can be modified. As a result, modified and/or bogus data can be substituted for the authentic sensor data.

Another tamper protection method utilizes hardware and software configured to encrypt sensor data prior to its wireless transmission from a source communications device to a destination communications device. This method involves encrypting the sensor data based on an encryption key generated by a cryptographic device. However, it should be appreciated that such a cryptographic method may be computationally intensive, costly, and overkill for a particular user. For example, an encryption method can be unnecessary in surveillance applications where data integrity is important, but secrecy of the data is not. The computationally intensive proves of encrypting surveillance data can also decrease throughput of sensor data.

It will be appreciated that the tamper problem described herein is not limited to sensor applications. In fact, any data transported over any type of wireless link is subject to tampering, including unauthorized modification of the data, and/or substitution of bogus data. The data can include any type of payload data including audio data, video data, sensor data acquired by any type of sensor, and any other kind of data.

Despite the advantages of the known tamper protection methods, there is a need for a tamper protection method and system that offers a high level of signal integrity assurance at a physical layer without a decrease in sensor data throughput. There is also a need to ensure data integrity without a need to modify existing methods of transporting data. It is also desirable to provide a method for integrity verification of data that is undetectable except by sophisticated detection equipment and is difficult to jam.

SUMMARY OF THE INVENTION

A method is provided for tamper detection of a transmitted signal. The method includes generating a first digital data signal having a first data rate and generating a second digital data signal having a second data rate. The method also includes concurrently transmitting the first digital data signal at a first carrier frequency using a first modulation format and the second digital data signal at a second carrier frequency using a second modulation format. The method further includes selecting the second carrier frequency and a bandwidth of the second digital data signal so that the second digital data signal is contained within a frequency spectrum defined by a bandwidth of the first digital data signal. The method includes verifying an integrity of the first digital data signal at a remote receiver based on defection at the remote receiver of the second digital data signal.

According to an aspect of the invention, the first digital data signal is combined with the second digital data signal prior to the transmission step. The second digital data signal is transmitted at a second transmitter power level that is below a transmitted power level required to interfere with a demodulation level of the first digital data signal at the remote receiver.

According to another aspect of the invention, the method includes selecting a second transmitter power level, for transmitting the second digital data signal, that is at least one order of magnitude less than a first transmitter power level used for transmitting the first digital data signal. The method also includes selecting the first data rate to be at least one order of magnitude higher as compared to the second data rate. The method further includes coding the second digital data signal using a coding scheme selected from the group consisting of pseudo-random number spreading, chaotic spreading, and data encryption.

According to another aspect of the invention, the method includes selecting the first modulation format to be different from the second modulation format. The method also includes applying signal processing gain at the remote receiver to detect the second digital data signal contained within the bandwidth of the first digital data signal. The signal processing gain is comprised of using a signal integration time that is at least one order of magnitude larger as compared to the first data rate.

According to another aspect of the invention, the method includes filtering at the remote receiver a composite signal comprised of the first digital data signal and the second digital data signal to remove at least a portion of a frequency spectrum comprising the first digital data signal. According to another aspect of the invention, the verifying step is comprised of identifying a presence within the second signal of a known data sequence.

A system is also provided for generating a tamper-protected transmitted signal. The system is comprised of a first data generator configured for generating a first digital data signal having a first data rate. The system is also comprised of a second data generator configured for generating a second digital data signal having a second data rate. The system is further comprised of a transmitter configured for concurrently transmitting the first digital data signal at a first carrier frequency using a first modulation format. The transmitter is also configured to transmit the second digital data signal at a second carrier frequency using a second modulation format. The second carrier frequency and a bandwidth of the second digital data signal are contained within a frequency spectrum defined by a bandwidth of the first digital data signal. Integrity of the first digital data signal can be verified at a remote receiver based on detection at the remote receiver of the second digital data signal.

According to an aspect of the invention, the transmitter transmits a composite signal which is comprised of the first digital data signal and the second digital data signal. The transmitter is configured for transmitting the second digital data signal at a second transmitter power level that is below a transmitted power level required to interfere with a demodulation level of the first digital data signal at the remote receiver. The transmitter is also configured for transmitting the second digital data signal at a second transmitter power level that is at least one order of magnitude less than a first transmitter power level used for transmitting the first digital data signal.

According to another embodiment of the invention, the first data rate is at least one order of magnitude higher as compared to the second data rate. According to another embodiment of the invention, the second digital data generator is configured for coding the second digital data signal using a coding scheme selected from the group consisting of pseudo-random number spreading, chaotic spreading, and data encryption. Also, the first modulation format is different as compared to the second modulation format.

According to another embodiment of the invention, the remote receiver is configured to provide signal processing gain to detect the second digital data signal contained within the bandwidth of the first digital data signal. The signal processing gain is comprised of an integrator circuit which utilizes an integration time that is at least one order of magnitude larger as compared to the first data rate. The remote receiver is also comprised of a filter configured for filtering from a composite signal at least a portion of a frequency spectrum comprising the first digital data signal. In this regard, it should be appreciated that the composite signal is comprised of the first digital data signal and the second digital data signal. The remote receiver is further comprised of one or more signal processing circuits configured for identifying a presence within the second signal of a known data sequence.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment or a hardware/software embodiment.

The present invention can be realized in one communications system. Alternatively, the present invention can be realized in several interconnected communication systems. Any kind of communication system or other apparatus adapted for carrying out the methods described herein is suited. A typical combination of hardware and software can be a wireless communications device. The wireless communications device can have a computer program that can control an internal computer system such that it carries out the methods described herein.

The present invention can be implemented in part as a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Embodiments of the present invention will now be described with respect to FIG. 1 through FIG. 4. Some embodiments of the present invention provide methods, systems, and apparatus relating to detecting whether a signal is tampered with by an unauthorized entity when the signal is transmitted wirelessly over a communications link. Accordingly, embodiments including the listed functions are discussed further below.

Figure 1:
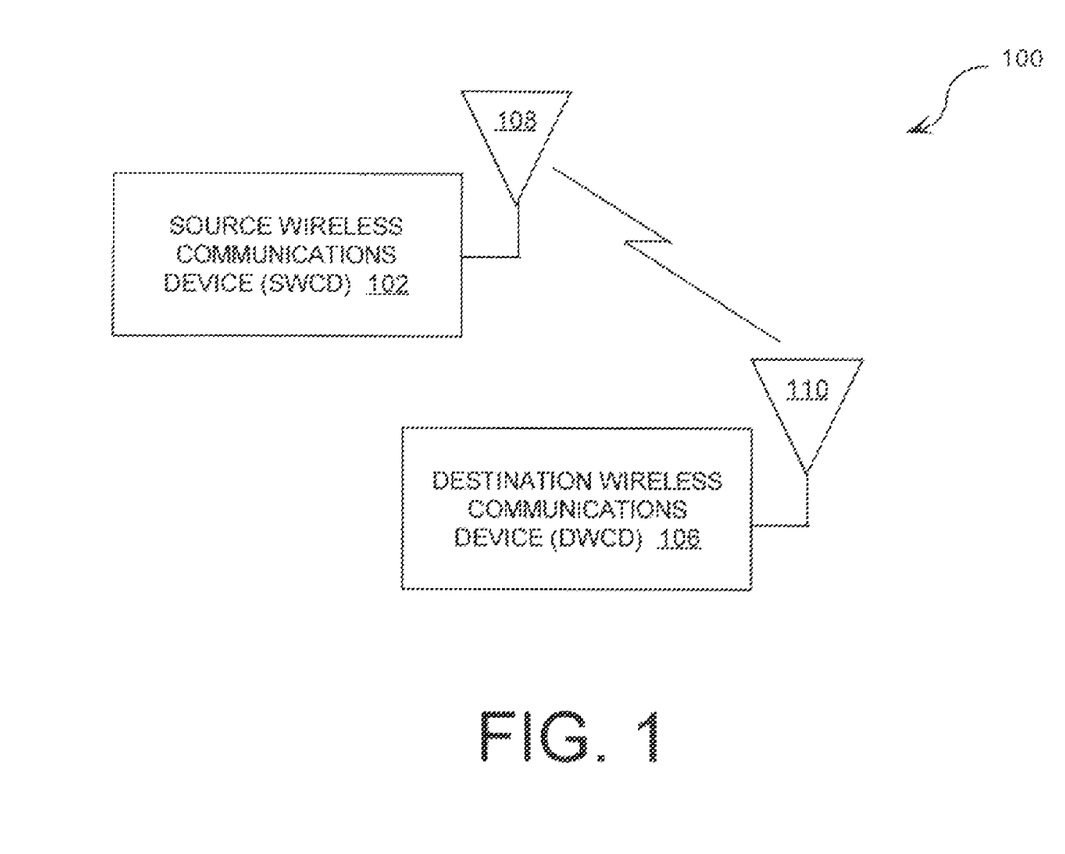
FIG. 1 is a block diagram of a communications system that is useful for understanding the invention.

Referring now to FIG. 1, there is provided a block diagram of a communications system 100 that is useful for understanding the invention. As shown in FIG. 1, the communications system 100 is comprised of a source wireless communications device (SWCD) 102 and a destination wireless communications device (DWCD) 106. The SWCD 102 includes a radio transmitter. For example, SWCD 102 can be a mobile radio, a mobile telephone, a wireless communication device used for communicating sensor data to a remote location, or any other wireless communications device used for transmitting data. As shown in FIG. 1, the SWCD 102 includes an antenna element 108. Antenna elements are known to persons skilled in the art. Thus, antenna elements will not be described in detail herein.

Referring again to FIG. 1, the SWCD 102 includes hardware and software for generating a first digital data signal. The first digital data signal is comprised of one or more signals including digital information such as voice, video, sensor, and/or data traffic (also herein referred to as one or more payload signals). Such digital information can be thought of as the payload information or data of the SWCD 102 as it generally comprises the information that is of primary interest to a user. The SWCD 102 also includes hardware and software for generating a second digital data signal. The second digital data signal is comprised of one or more signals including integrity data (also referred to herein as one or more integrity signals). The SWCD 102 further includes hardware and software for adding an integrity signal to a payload signal so as to thereby create a composite signal. The SWCD 102 includes hardware and software for wirelessly transmitting the composite signal to the DWCD 106. The SWCD 102 will be described in greater detail below in relation to FIG. 2.

The DWCD 106 includes a radio receive device. For example, the DWCD 106 can be comprised of a mobile radio, a mobile telephone, a receiving station for collection of sensor data, or any other wireless communications device. As shown in FIG. 1, the DWCD 106 includes an antenna element 110. Antenna elements are known to persons skilled in the art. Thus, the antenna element 110 will not be described in detail herein.

Referring again to FIG. 1, the DWCD 106 also includes hardware and software for receiving one or more composite signals transmitted wirelessly from the SWCD 102. The DWCD 106 includes hardware and software for processing a composite signal to acquire an integrity signal present therein. The DWCD 106 further includes hardware and software for determining whether there are any deviations in the integrity signal from known properties of the integrity signal. If the DWCD 106 determines that there is a deviation in the integrity signal, the composite signal is deemed to have been tampered with by an unauthorised entity. As such, the DWCD 106 will perform processing to invoke any appropriate action. The DWCD 106 will be described in greater detail below in relation to FIG. 3.

A person skilled in the art will appreciate that the communications system 100 architecture is one embodiment of a communications system. However, the invention is not limited in this regard and any other communications system architecture can be used without limitation.

Figure 2:
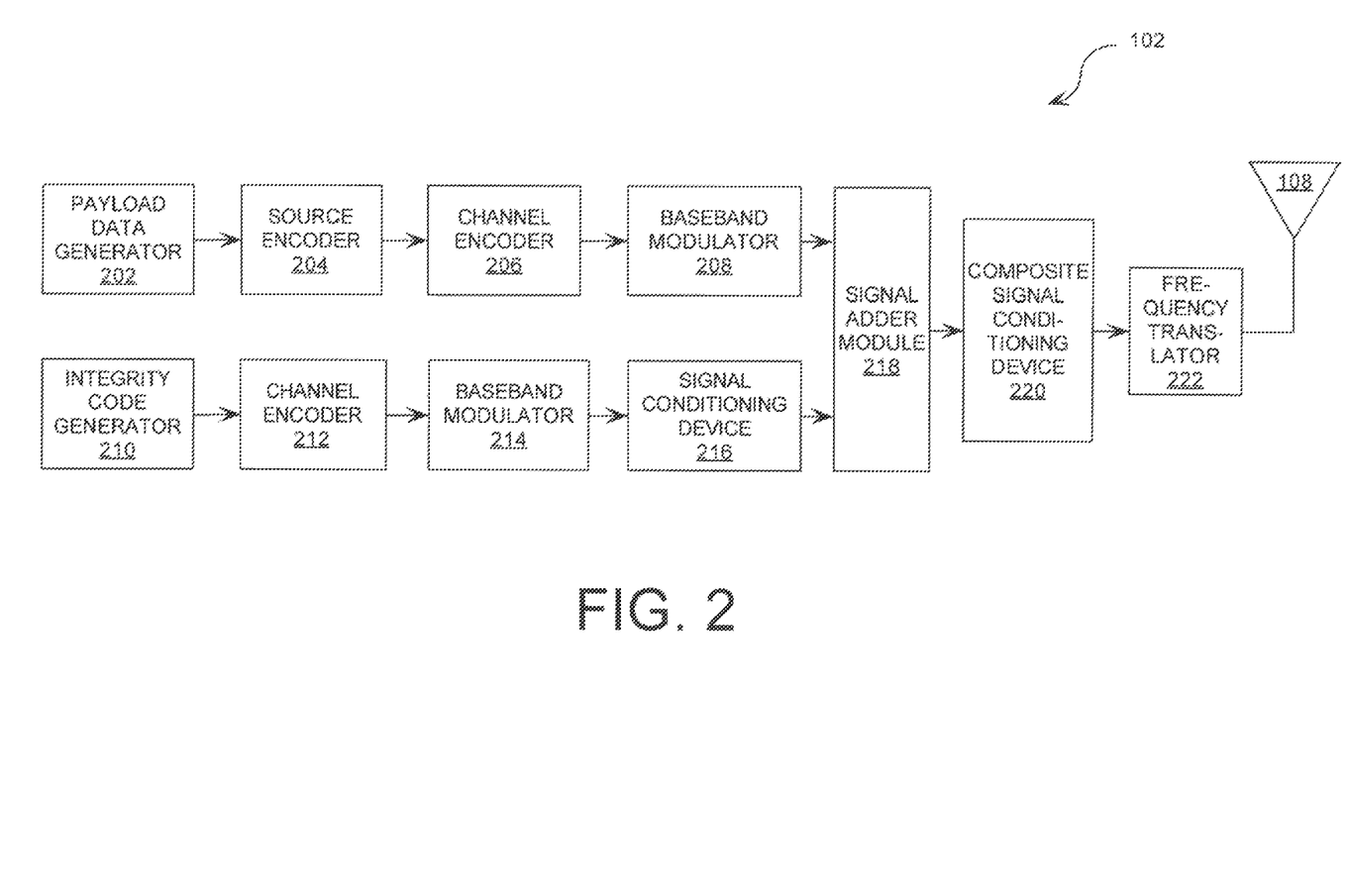
FIG. 2 is a block diagram of a source wireless communications device shown in FIG. 1 that is useful for understanding the invention.

Referring new to FIG. 2, there is provided a more detailed block diagram of the SWCD 102 described above in relation to FIG. 1. As shown in FIG. 2, the SWCD 102 is comprised of a payload data generator (PDG) 202, a source encoder 204, a channel encoder 206, and a baseband modulator 208. The SWCD 102 is also comprised of an integrity code generator (ICG) 210, a channel encoder 212, a baseband modulator 214, and a signal conditioning device (SCD) 216. The SWCD 102 is further comprised of a signal adder module (SAM) 218, a composite signal conditioning device (CSCD) 220, a frequency translator 222, and antenna element 108.

The PDG 202 is comprised of hardware and software for generating payload data and supplying the payload data to the source encoder 204. However, it should be appreciated that the payload data supplied to the source encoder 204 can be generated at the PDG 202, or if can be payload data of a signal transmitted to the SWCD 102 by an external device. For example, the PDG 202 can be a voice or video coder that is respectively capable of converting voice audio or a video image into a coded digital signal. Such audio and video coders are well known in the art. Alternatively, the PDG 202 can convert any other type of a signal from a sensor device to a digital data signal. For example, the PDG can be as simple as an analog to digital (A/D) converter. PDGs are well known to persons skilled in the art. Thus; PDGs will not be described in great detail herein.

As shown in FIG. 2, the PDG 202 is coupled to the source encoder 204. As such, the PDG 202 is comprised of a circuit configured to communicate payload data to the source encoder 204. In turn, the source encoder 204 is comprised of hardware and software for receiving payload data from the PDG 202. The source encoder 204 is also comprised of hardware and software for performing a further coding of the payload data. The further coding advantageously includes a data compression process based on any of a variety of well known data compression schemes suitable for voice data, video data, or other type of sensor data. For example, in the case of a video signal, the source encoder can be a well known MPEG type video compression algorithm. Regardless of the particular compression process that is used, the compression coding can advantageously reduce any redundancy in the payload data. In this regard, the source encoder 204 can perform processing to represent the payload data with a fewer number of bits carrying more payload information. Source encoders 204 are well known to persons skilled in the art. Thus, source encoders will not be described in great detail herein.

Referring again to FIG. 2, the source encoder 204 is coupled to the channel encoder 206. In this regard, the source encoder 204 is comprised of hardware and software for communicating the compressed payload data to the channel encoder 206. The channel encoder 206 is comprised of hardware and software for receiving the compressed payload data from the source encoder 204. The channel encoder 206 is also comprised of hardware and software for channel encoding the compressed payload data in accordance with known operational requirements, physical layer protocols, and transmission channel characteristics of the communication system 100. In this regard, the channel encoder 206 can perform actions involving adding one or more bits (such as one or more parity bits) of data to the compressed payload data. Channel encoders are well known to persons skilled in the art. Thus, channel encoders will not be described in great detail herein.

The channel encoder 206 is coupled to the baseband modulator 208. In this regard, the channel encoder 206 is comprised of hardware and software for communicating encoded payload data to the baseband modulator 208. In turn, the baseband modulator 208 is comprised of hardware and software for receiving encoded payload data from the channel encoder 206. The baseband modulator 208 is also comprised of hardware and software for modulating at least one intermediate frequency (IF) carrier signal using the encoded payload data. For example, certain modulation formats, such as orthogonal frequency division multiplexed modulation (OFDM) can actually be comprised of more than one carrier frequency. For convenience, the modulated IF carrier signal modulated by the payload data will hereinafter be referred to as the payload signal. Baseband modulators of various types (including OFDM type modulators) are well known to persons skilled in the art. Thus, baseband modulators will not be described in great detail herein.

Regardless of the IF frequency or frequencies selected, it will be appreciated that the IF carrier signal modulated by the payload data will generally be some RF signal that is selected by a system designer to be somewhat lower in frequency as compared to an output carrier frequency of the SWCD 102. However, it should be understood that the invention is not limited in this regard.

As shown in FIG. 2, the baseband modulator 208 is coupled to the SAM 218. The baseband modulator 208 is comprised of hardware and software for communicating a payload signal to the SAM 218 where an integrity signal is added to the payload signal. The SAM 218 will be described in greater detail below.

Referring again to FIG. 2, the ICG 210 is comprised of hardware and software for generating an integrity code (also referred to herein as integrity data) and supplying the integrity code to the channel encoder 212. It should be appreciated that the ICG 210 can be any code generator known in the art for generating a unique sequence of numbers or symbols. For example, a basic implementation of such a code generator can include a pseudo-random number/symbol sequence generator. A slightly more complex implementation of the ICG 210, which would offer a higher level of security, would be a table based cipher or a table based periodic modification to the pseudo-random number/symbol sequence generator.

The phrase "fable based cipher" as used herein refers to an instantiation of different sequence generation circuits by reconfiguring available hardware or software resources based on configuration data stored in a table containing multiple configurations. This table is replicated at the transmitter and receiver. The phrase "table based cipher" as used herein also refers a simultaneous reconfiguration of the transmitter and receiver, under a control of a synchronization scheme, to invoke a new scheme for generating a verification code. As should foe understood, a table based cipher modification to a pseudo-random number/symbol sequence generator can help confuse would be interceptors from discovering a sequence and sequence generation scheme via trial and error.

The phrase "table based periodic modification" as used herein refers to a fixed instantiation of a cipher which is reseeded under a control of a synchronization scheme. The phrase "table based periodic modification" as used herein also refers to a simultaneous reseeding of the transmitter and receiver to interrupt a generation of a verification code. The phrase "table based periodic modification" as used herein further refers to a simultaneous reseeding of the transmitter and receiver to abruptly move a portion of a sequence to a new location within the sequence. As should be understood, a table based periodic modification to the pseudo-random number/symbol sequence generator can inhibit any would be interceptor's attempt to identify a sequence and sequence generation scheme.

An even more complex implementation of the code generator that would offer an even higher level of security would include an encryption device that encrypts the pseudo-random number/symbol sequence. Alternatively, a chaos generator can also be used for this purpose. For example, a pseudo-random number generator employs a set of linear operations to generate an output. The output is used to verify the integrity of a signal by matching transmitted and received sequences. Given enough of an observation window and a moderate amount of computational resources, one can reverse engineer the pseudo-random number generator and it's state at any given time. However, if the integrity signal is encrypted before transmission, then the integrity sequence generator is masked by the integrity signal in a much more robust manner than an integrity sequence generator changing or reseeding process. In this regard, it should be appreciated that the integrity data is any sequence of numbers or symbols that is difficult to predict or mimic. As such, the potential for detection of the integrity data is low, and the probability of some unauthorized entity generating the correct integrity data is also low.

As shown in FIG. 2, the ICG 210 is coupled to the channel encoder 212. In this regard, the ICG 210 is comprised of hardware and software for communicating integrity data to the channel encoder 212. In turn, the channel encoder 212 is comprised of hardware and software for receiving integrity data from the ICG 210. The channel encoder 212 is also comprised of hardware and software for channel encoding the integrity data in accordance with one or more known physical layer protocols, operational requirements, and transmission channel characteristics of the communication system 100. In this regard, the channel encoder 212 can perform actions involving adding one or more bits (such as a parity bit) of data to the integrity data. Channel encoders are well known to persons skilled in the art. Thus, channel encoders will not be described in great detail herein.

The channel encoder 212 is coupled to the baseband modulator 214. In this regard, the channel encoder 212 is comprised of hardware and software for communicating the encoded integrity data to the baseband modulator 214. In turn, the baseband modulator 214 is comprised of hardware and software for receiving the encoded integrity data from the channel encoder 212. The baseband modulator 214 is also comprised of hardware and software for modulating an intermediate frequency (IF) carrier signal using the encoded integrity data. The IF carrier signal modulated by the encoded integrity data will generally be some RF signal that is selected by a designer to be somewhat lower in bandwidth as compared to an output carrier frequency of the SWCD 102. However, the invention is not limited in this regard. For convenience, the modulated IF carrier signal modulated by the encoded integrity data will hereinafter be referred to as the integrity signal.

Referring again to FIG. 2, the baseband modulator 214 is coupled to the SCD 216. In this regard, the baseband modulator 214 is comprised of hardware and software for communicating an integrity signal to the SCD 216. The SOD 216 is comprised of hardware and software for receiving the integrity signal from the baseband modulator 214. The SCD 216 is also comprised of hardware and software for processing the integrity signal to remove or suppress any features that would interfere with a payload signal. This processing can involve scaling a magnitude of the integrity signal, pulse shaping of the integrity signal, biasing the integrity signal, and/or adding frequency offsets to the integrity signal. SCDs are well known to persons skilled in the art. Thus, SCDs will not be described in great detail herein.

The SCD 216 is coupled the SAM 218. In this regard, the SCD 216 is comprised of hardware and software for communicating an integrity signal to the SAM 218. The SAM 218 is comprised of hardware and software for receiving a payload signal from the baseband modulator 208 and an integrity signal from the SCD 216. The SAM 218 will be described in greater detail below.

According to an embodiment of the invention, different modulation formats are advantageously used respectively by the baseband modulator 208 and the baseband modulator 214 for modulating the payload signal and the integrity signal. A modulation format used by baseband modulator 214 for modulating the integrity signal is advantageously selected so that it does not significantly interfere with the modulation format used for modulating the payload signal when the two signals are combined to form a composite signal. For example, in a preferred embodiment of the invention, the baseband modulator 208 is an orthogonal frequency division multiplexed (OFDM) type modulator. OFDM waveforms are well known in the art. Such waveforms can comprise a relatively wideband signal that includes several carrier frequencies that are generally closely spaced to one another. Each carrier frequency is typically used to transport a portion of the total data. In contrast, the integrity signal is preferably formed using a narrowband modulation technique. For example, a conventional binary phase shift keying (BPSK) technique can be used for this purpose. Still, it should be understood that the invention is not limited to the specific modulation techniques described herein. Any other suitable modulation technique can be used.

Regardless of the specific modulation technique selected, it should be appreciated that the payload signal has a data rate in accordance with a particular SWCD 102 application. In general, the integrity signal will have a data rate that is chosen so that it is high enough to enable a timely detection of tampering and low enough to allow a modulated integrity data to be transmitted with a bandwidth that is much lower than a bandwidth of the payload signal. In this regard, the payload signal will generally have a data rate that is substantially greater than a data rate of the integrity signal. As used herein, the term "substantially greater" means that the payload signal data rate is at least one order of magnitude larger than the data rate of the integrity signal. This large difference in data rate can be useful for allowing the payload signal to mask the integrity signal, thereby providing the integrity signal with a low probability of detection.

The higher data rate of the payload signal as compared to the integrity signal will generally result in the payload signal having a much larger bandwidth as compared to the integrity signal. The integrity signal advantageously has an IF carrier frequency that is in the same region of the electromagnetic spectrum as an IF carrier frequency of the payload signal. More particularly, a center frequency of the integrity signal is chosen to be within a bandwidth of the payload signal. Accordingly, the bandwidth of the integrity signal can be contained within the bandwidth of the payload signal. In this sense, the payload signal can be used to mask the integrity signal when the two signals are added or combined together.

In order to further mask the integrity signal, the integrity signal preferably has a power level that is substantially less than the payload signal. For the purpose of this application, this means that the integrity signal has a power level that is at least one order of magnitude lower than a power level of the payload signal. The relatively low power of the integrity signal ensures that the integrity signal will be difficult to detect. Furthermore, the relatively low power of the integrity signal ensures that it will not significantly interfere with the payload signal when the two signals are added together to form a composite signal in SAM 218.

As previously noted, the integrity signal has a lower data rate compared to the payload signal. Accordingly, the integrity signal advantageously has a substantially longer transmission time for each symbol as compared to the transmission time for each symbol of the payload signal. This longer symbol time is advantageous because it can be used to facilitate greater processing gain for the purpose of extracting the integrity signal from the composite signal. For example, longer integration times can be used to facilitate improved detection of the data contained in the integrity signal. In this, regard, it should be appreciated that power is energy times time. Therefore, the longer an integrity signal is integrated with a payload signal, the greater a power of a resulting signal. It should also be appreciated that the longer additive white Gaussian noise (AWGN) is averaged the more an AWGN mean converges to a long time signal mean. Thus, the effect of noise power on signal detection is reduced as integration times increase thereby allowing a signal having a low data rate to be detected in a signal having a low signal-to-noise ratio. It should further be appreciated that a longer symbol duration allows a longer integration time. A longer symbol duration also allows an integrity signal having a low data rate to be detectible in a signal having a low signal to noise ratio. A longer symbol duration further allows an integrity signal to operate at a much lower power level than the payload signal. Consequently, the substantially lower power of the integrity signal will not prevent the integrity signal from being detected.

The SAM 218 is comprised of hardware and software for adding an integrity signal to a payload signal. It should be appreciated that the integrity signal has a narrow bandwidth compared to a bandwidth of the payload signal. As such, the payload signal masks the integrity signal thereby providing the integrity signal with a low probability of defection characteristic. The resulting signal is a composite signal which may be of a baseband frequency, a near baseband frequency, or an intermediate frequency (IF). In order to produce a composite signal having a relatively low power integrity signal and a substantially higher powered payload signal, the integrity signal provided to the SAM 218 is at a substantially lower power as compared to the payload signal communicated to SAM 218. The different power levels are achieved using conventional means such as digital scaling, RF amplifier or attenuator circuitry (not shown) as needed. The digital scaling circuitry can be provided to scale two signals relative to each other. Still, the invention is not limited in this regard.

The SAM 218 is further comprised of hardware and software for communicating the composite signal to the CSCD 220. The CSCD 220 is comprised of hardware and software for processing the composite signal to place the composite signal in an appropriate form for transmission to the DWCD 106 (described above in relation to FIG. 1). This processing can involve pulse shaping of the composite signal, signal pre-distortion of the composite signal, and/or other well known signal conditioning of the composite signal CSCDs are well known to persons skilled in the art. Thus, CSCDs will not be described in great detail herein.

The CSCD 220 is coupled to the frequency translator 222. In this regard, the CSCD 220 is comprised of hardware and software for communicating a composite signal to the frequency translator 222. The frequency translator 222 is comprised of hardware and software for receiving composite signals of a plurality of baseband frequencies, near baseband frequencies, or intermediate frequencies (IF). The frequency translator 222 is also comprised of a circuit to translate the composite signal to a radio frequency (RF) for transmission to DWCD 106 (described above in relation to FIG. 1). Frequency translators are well known to persons skilled in the art. For example, conventional mixing circuits are commonly used for such purposes. Thus, frequency translators will not be described in great detail herein.

A person skilled in the art will appreciate that the SWCD 102 architecture is one embodiment of a SWCD architecture. However, the invention is not limited in this regard and any other SWCD architecture can be used without limitation provided that it can generate a cryptographically secure integrity signal and add the same to a payload signal. For example, the SWCD 102 can be absent of the channel encoder 212. In such a scenario, the 102 architecture of FIG. 2 can be amended accordingly.

Figure 3:
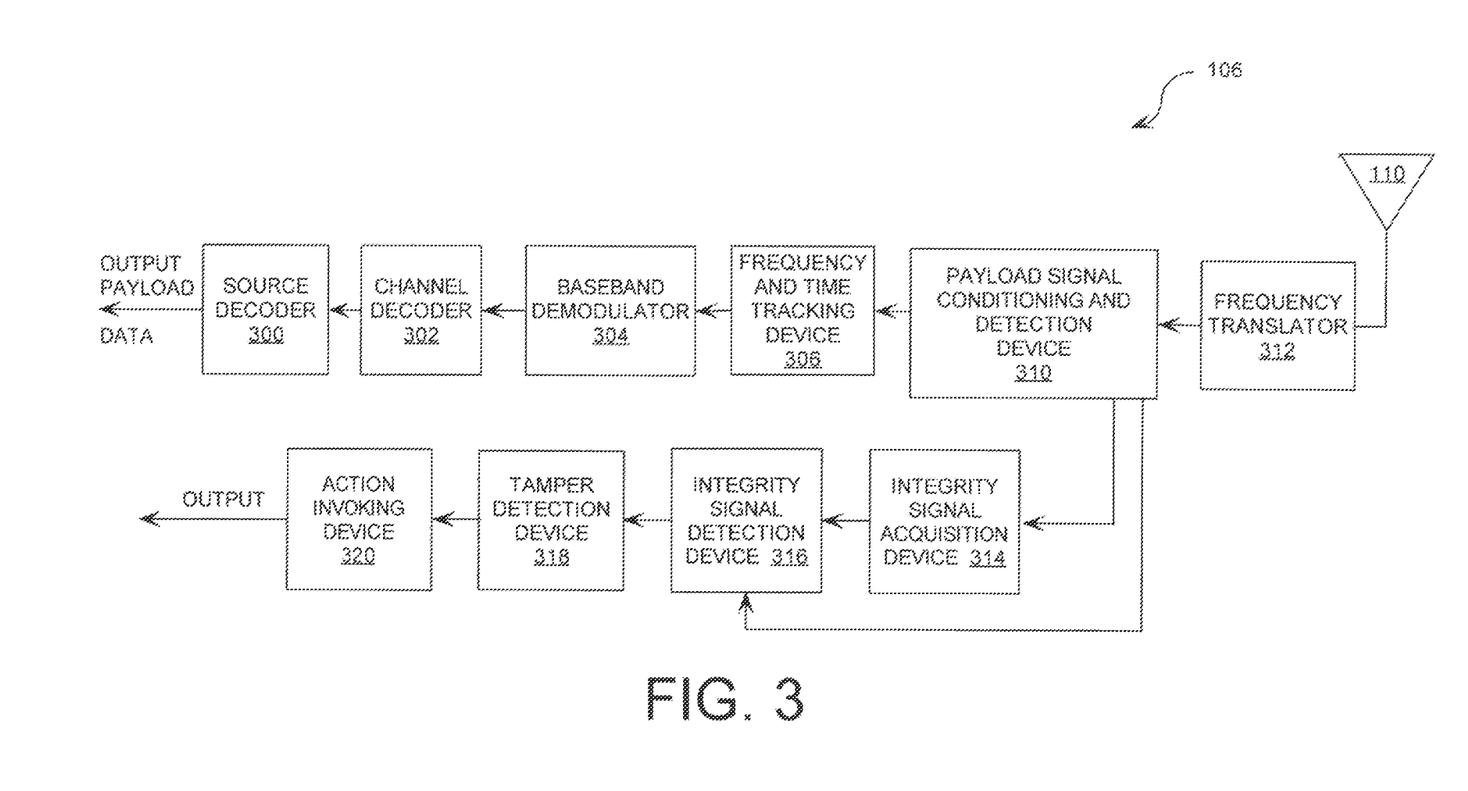
FIG. 3 is a block diagram of a destination wireless communications device shown in FIG. 1 that is useful for understanding the invention.

Referring now to FIG. 3, there is provided a more detailed block diagram of the DWCD 106 described above in relation to FIG. 1. As shown in FIG. 3, the DWCD 106 is comprised of a frequency translator 312 and a payload signal conditioning and detection device (PSCDD) 310. The DWCD 106 is also comprised of a frequency and time tracking device (FTTD) 306, a baseband demodulator 304, a channel decoder 302, and a source decoder 300. The DWCD 106 is further comprised of an integrity signal acquisition device (SAD) 314, an integrity signal defection device (SDD) 316, a tamper detection device (TDD) 318, and an action invoking device (AID) 320.

The frequency translator 312 is comprised of a hardware and software for receiving one or more composite signals of a plurality of radio frequencies (RFs). The frequency translator 312 is comprised of a circuit configured to translate a composite signal to a baseband frequency, a near baseband frequency, or an intermediate frequency (IF) (i.e., down convert a composite signal to a suitable baseband or intermediate frequency). Frequency translators are well known to persons skilled in the art. For example, a zone filter and a low noise amplifier can be used to isolate and amplify the composite signal. A conventional mixer circuit can be used for implementing frequency translators. Thus, frequency translators will not be described in great detail herein.

As shown in FIG. 3, the frequency translator 312 is coupled to the PSCDD 310. In this regard, the frequency translator 312 is comprised of hardware and software for communicating composite signals of a plurality of baseband frequencies, near baseband frequencies, or intermediate frequencies (IFs) to the PSCDD 310. The PSCDD 310 is comprised of hardware and software for receiving composite signals from the frequency translator 312. The PSCDD 310 is also comprised of hardware and software for processing the composite signal to place the composite signal is an appropriate form for transmission to the FTTD 306, the ISAD 314, and/or the ISDD 316. This processing can involve noise removal from the composite signal, pulse shaping of the composite signal, and/or pulse clipping of the composite signal.

As shown in FIG. 3, the PSCDD 310 is coupled to the FTTD 306. In this regard, the PSCDD 310 is comprised of hardware and software for communicating a composite signal and/or a payload signal to the FTTD 306. The PSCDD 310 is also coupled to the ISAD 314 and the ISDD 316. In this regard, the PSCDD 310 is comprised of hardware and software for communicating a composite signal to the ISAD 314 and/or the ISDD 316.

The FTTD 306 is comprised of hardware and software for receiving a composite signal and/or a payload signal from the PSCDD 310. The FTTD 306 is also comprised of hardware and software for tracking a frequency of a received signal and a time of receiving the signal. In this regard, it should be appreciated that oscillators in the transmitter and receiver are never exactly matched. The oscillator mismatches cause carrier and symbol timing drift which results in degraded error performance. Tracking loops must be used to synchronize the two systems in terms of symbol timing and carrier offsets to preserve performance. In systems communicating a plurality of data rates simultaneously, the tracking loops are best implemented when the symbol rates are phase locked and rationally related in time and frequency. In that instance, tracking performed on the most offset sensitive signals is valid for the less offset sensitive signals (usually lower rate signals). Thus, additional tracking loops are not required. The preferred embodiment of the invention has the lower rate integrity signal locked to and having a rational relationship with the payload signal. As such, the payload signal bops can be used to lock the integrity signal without separate symbol times and frequency offset tracking loops. As shown in FIG. 3, the FTTD 306 is coupled to the baseband demodulator 304. In this regard, the FTTD 306 is comprised of hardware and software for communicating a signal to the baseband demodulator 304.

The baseband demodulator 304 is comprised of hardware and/or software for receiving payload signals and/or composite signals from the FTTD 306. The baseband demodulator 304 is also comprised of hardware and/or software for demodulating a payload signal and/or a composite signal so as to extract encoded payload data. The exact type of baseband demodulator used will depend on the modulation scheme implemented at the baseband modulator 208 provided in the SWCD 102. In general, the baseband demodulator 304 will be any conventional demodulator circuit and/or software system suitable for demodulating the payload signal and/or the composite signal so as to extract the encoded payload data. For example, if the baseband modulator 208 is an OFDM type modulator, then the baseband demodulator 304 is preferably an OFDM type demodulator. Such demodulator systems are well known in the art and therefore will not be described here in detail.

As shown in FIG. 3, the baseband demodulator 304 is coupled to the channel decoder 302. In this regard, the baseband demodulator 304 is comprised of hardware and/or software for communicating encoded payload data to the channel decoder 302. The channel decoder 302 is comprised of hardware and software for receiving encoded payload data from the baseband demodulator 304. The channel decoder 302 is also comprised of hardware and/or software for performing the inverse functions of the channel encoder 208 (described above in relation to FIG. 2). The channel decoder 302 is coupled to the source decoder 300. In this regard, the channel decoder 302 is comprised of hardware and/or software for communicating channel decoded payload data to the source decoder 300. Channel decoders are well known to persons skilled in the art. Thus, channel decoders will not be described in great detail herein.

The source decoder 300 is comprised of hardware and software for receiving a channel decoded payload data from the channel decoder 302. The source decoder 300 is also comprised of hardware and software for performing inverse functions of the source encoder 204 (described above in relation to FIG. 2). As such, the source decoder 300 outputs source decoded payload data to a device (not shown). For example, the decoded payload data can be transmitted to a display device, audio reproduction device, or a memory device such that various users of the DWCD 106 can access and view the payload data at any future time. Source decoders are well known to persons skilled in the art. Thus, source decoders will not be described in great detail herein.

Referring again to FIG. 3, the ISAD 314 can be comprised of hardware and/or software for receiving composite signals from the PSCDD 310 and for acquiring integrity signals from the composite signals. Integrity signal acquisition can rely on acquisition processes associated with the payload signal when possible. For example, since the symbol rate of the integrity signal is lower than that of the payload signal, the frequency offset for the integrity signal can be considered to be within operational bounds when the baseband demodulator 304 has performed frequency and symbol timing acquisition. Also, the defection of signal onset need not be performed in the baseband demodulator 304 for the payload signal and the ISDD 316 for the integrity signal. Instead, it can be assumed that if a payload signal is confirmed to be present via a signal detection method, then the integrity signal is also confirmed to be present. Signal defection methods are well known to persons skilled in the art, and therefore will not be described in great detail herein.

As shown in FIG. 3, the ISAD 314 is coupled to the ISDD 316. In this regard, the ISAD 314 is comprised of hardware and/or software configured to communicate integrity signals to the ISDD 316. The ISDD 316 is comprised of hardware and/or software for receiving integrity signals from the ISAD 314 and for processing an integrity signal to defect any integrity data contained therein. A person skilled in the art will appreciate that this processing can be designed to detect a number/symbol sequence present in an integrity signal. Defected numbers or symbols in an integrity signal are communicated by the ISDD 318 to the TDD 318. The TDD 318 uses this information to determine if the detected numbers and/or symbols are consistent, in whole or in part, with a valid sequence of numbers and/or symbols associated with the integrity signal.

A person skilled in the art will also appreciate that this processing can be accomplished by a demodulation process in the ISDD 316 followed by a comparison of demodulated symbols under the control of a symbol timing loop once initial sequence timing has been acquired via some form of time location process. For example, payload data is communicated from a transceiver to a receiver in a packet based form. Integrity signal timing is synchronized such that an onset of the integrity symbol is aligned with the onset of the payload signal. The integrity signal encoding is based on a continuously running algorithm while the payload packets are intermittent. The received integrity sequence is correlated with the integrity sequence generated at the receiver to align said integrity sequences. Once the integrity sequences are aligned, the received integrity symbols are compared to a locally generated sequence on a synchronized symbol by symbol basis. Alternatively, the comparison can be performed on a block of integrity symbols at a time of using a sliding correlation with a known block generated at the receiver. The known block can be periodically updated to account for changes that are a result of the time varying nature of the integrity sequence. The demodulation process can include a threshold comparison of one or more signal characteristics to one or more fixed threshold values or adaptive threshold values. If the one or more signal characteristics do not equal the one or more threshold values, the ISDD 316 can communicate a signal to the TDD 318 indicating that one or more signal characteristics fall outside of a threshold range.

A person skilled in the art will also appreciate that in certain scenarios, the ISDD 316 can include hardware and software for performing a forward correction code (FEC) to provide a high confidence level in a detection of a signal carrying integrity data. FECs are well known to persons skilled in the art. Thus, FECs will not be described in great detail herein. However, it should be understood that an FEC is not generally required where a correlation based detection method is used to detect integrity data within a composite signal or an integrity signal. In such methods, a correlation window can be set for a sufficiently long period to provide adequate processing gain without the need for an FEC. Such correlation based detection methods can include a sliding window correlation method, a contiguous window correlation method, and/or a non-contiguous window correlation method. Each of the listed methods can include a comparison of one or more correlation results to one or more threshold values. The one or more threshold values can be fixed threshold values or adaptive threshold values. If adaptive threshold values are used, an adaptive window can be adjusted by one or more parameters of a payload signal and/or one or more known attributes of a composite signal.

As shown in FIG. 3, the PSCDD 310 can be coupled to the ISDD 316. In this regard, the PSCDD 310 can be comprised of a circuit configured for communicating a composite signal to the ISDD 316. In such a scenario, the ISDD 316 can include a circuit configured for receipt of a composite signal from the PSCDD 310. The ISDD 316 can also include hardware and software for acquiring an integrity signal from a composite signal. This acquisition process can involve filtering a bulk of a payload signal from a composite signal, integrating integrity signal symbol times, re-modulating the payload signal, subtracting the payload signal, and/or other means of discriminating one signal from another signal.

According to an embodiment of the invention, the ISDD 316 can be comprised of a filter circuit having a gain determined by a known power level of an integrity signal and a known power level of a payload signal. As such, substantially all of the payload signal can be filtered from the composite signal thereby revealing the integrity signal. Subsequently, the ISDD 316 can perform processing on the integrity signal to detect any integrity data present therein.

Referring again to FIG. 3, the ISDD 316 is coupled to the TDD 318. In this regard, the ISDD 316 is comprised of hardware and software for communicating integrity data and/or an indicator signal to the TDD 318. The TDD 318 is comprised of hardware and software for receiving integrity data and/or an indicator signal from the ISDD 316. The TDD 318 is also comprised of hardware and software for determining whether the integrity signal is valid. For example, the TDD 318 can determine whether at least N out of M numbers or symbols in a sequence correctly corresponds to a predetermined pseudo-random number/symbol sequence or other predetermined sequence. This determination can involve a single event based decision, a multiple event per second based decisions, or a consecutive event based decision.

If the TDD 318 determines that the integrity signal is valid, the composite signal is deemed to not have been tampered with by an unauthorized entity. As such, the TDD 318 can either cease any further actions or transmit a signal to the AID 320 indicating that the content of the composite signal has not been compromised.

If the TDD 318 determines that the integrity signal is not valid, then the composite signal is deemed to have been tampered with by an unauthorized entity. It should be appreciated that a deviation in the integrity signal can exist when a composite signal is absent of an integrity signal, one or more integrity signal characteristics fall outside of a threshold range, a known number/symbol sequence is not present in a composite signal, and/or a known number/symbol sequence is not present in an integrity signal. Upon such a determination, the TDD 318 transmits a signal indicating that the contents of the composite signal have been compromised to the AID 320. The TDD 318 can also transmit a signal including a command to invoke an appropriate action to the AID 320.

Upon receipt of such signal, the AID 320 performs any necessary actions. For example, the AID 320 can perform actions to output a message to a user indicating that the composite signal has been tampered with by an unauthorized entity. The AID 320 can also perform actions for discarding any associated payload data or erasing any associated payload data from a memory device (hot shown). The AID 320 can further perform actions to transmit a message to a specific destination indicating that the contents of the composite signal have been compromised.

A person skied in the art will appreciate that the DWCD 106 architecture is one embodiment of a DWCD architecture. However, the invention is not limited in this regard and any other DWCD architecture can be used without limitation provided that it can acquire an integrity signal from the composite signal and determine whether or not there are any deviations in an integrity signal from one or more known properties of the integrity signal.

Figure 4A:
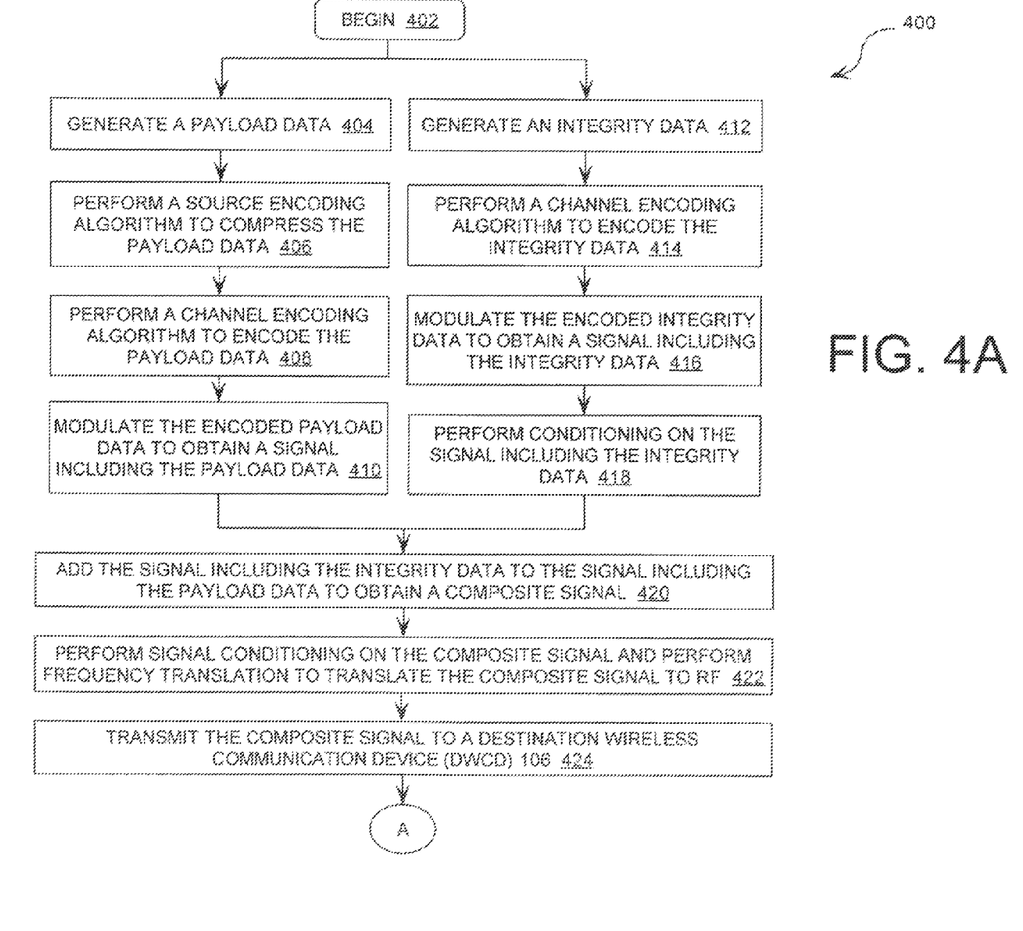
FIG. 4A through FIG. 4B collectively illustrate a method for detecting whether a signal transmitted wirelessly over a communications link has been tampered with by an unauthorized entity.

FIG. 4A through FIG. 4B collectively Illustrate a method 400 for detecting whether or not a signal has been tampered with by an unauthorized entity while transmitted wirelessly over a communications link. Referring now to FIG. 4A, the method 400 begins at step 402 and continues to step 404 and step 412. In step 404, payload data is generated by a payload data generator (PDG) 202 (described above in relation to FIG. 2). In step 406, a source encoding algorithm is performed by a source encoder 204 (described above in relation to FIG. 2) to compress the payload data. This step can involve removing any redundancies present in the payload data. It should be appreciated that any source encoding algorithm known in the art can be used without limitation. In step 408, a channel encoding algorithm is performed by a channel encoder 206 (described above in relation to FIG. 2) to encode the payload data. This step can involve adding one or more bits (for example, one or more parity bits) to the payload data. It should be appreciated that any channel encoding algorithm known in the art can be used without limitation. Subsequently, control passes to step 410. In step 410, the encoded payload data is modulated using a baseband modulator 208 (described above in relation to FIG. 2) to obtain a signal including the payload data (herein after referred to as a payload signal). After step 410, the method 400 continues to step 420 where an integrity signal is added to the payload signal (i.e., the two signals are combined to form a composite signal).

In step 412, integrity data is generated by an integrity code generator (ICG) 210 (described above in relation to FIG. 2). It should be appreciated that the integrity code can be a cryptographically secure integrity data having a low probability of intercept characteristic (i.e., a unique sequence of numbers or symbols that is difficult to predict or mimic). For example, the integrity code can be pseudo-random number/symbol sequence, a table based cipher pseudo-random number/symbol sequence, a table based periodic pseudo-random number/symbol sequence, an encrypted number/symbol sequence, or a chaotic number/symbol sequence.

After generating the integrity data, control passes to step 414. In step 414, a channel encoding algorithm is performed by a channel encoder 212 (described above in relation to FIG. 2) to channel encode the integrity data. This step can involve adding one or more bits (e.g., parity bits) to the integrity signal. It should be appreciated that any channel encoding algorithm known in the art can be used without limitation. Subsequently, step 416 is performed where the encoded integrity data is modulated using a baseband modulator 214 (described above in relation to FIG. 2) to obtain a signal including the integrity data (herein referred to as an integrity signal). It should be appreciated that different modulation formats can be advantageously used respectively to step 410 and step 416. In this regard, the integrity signal can have a modulation format selected so that it does not significantly interfere with the modulation format used for modulating the payload signal when the two signals are combined or added together to form a composite signal.

In step 418, signal conditioning is performed by a signal conditioning device (SCD) 216 (described above in relation to FIG. 2) on the integrity signal. This step can involve removing or suppressing one or more features of the integrity signal that may interfere with a payload signal. For example, this step can involve filtering the integrity signal, pulse shaping of the integrity signal, and/or scaling of the integrity signal. After step 418 is fully performed, the method 400 continues to step 420.

In step 420, the integrity signal is added to the payload signal thereby forming a composite signal (i.e., the two signals are combined together to form a composite signal). It should be appreciated that the integrity signal can have a lower data rate than a data rate of the payload signal. The integrity signal can also have a narrower bandwidth than the bandwidth of the payload signal. In effect, the integrity signal is fully masked by the payload signal. As such, the integrity signal has a low probability of detection characteristic. It should also be appreciated that the integrity signal can have a substantially longer symbol time than a symbol time of the payload signal. As such, the integrity signal can be transmitted with a much lower power than that required to transmit the payload signal.

After step 420, control passes to step 422 where signal conditioning is performed by a composite signal conditioning device (CSCD) 220 (described above in relation to FIG. 2) on the composite signal. This signal conditioning can involve noise removal from the composite signal, pulse shaping of the composite signal, and/or pre-distortion of the composite signal. Frequency translation is also performed in step 422. In this regard, it should be appreciated that the composite signal can be of a plurality of baseband frequencies, near baseband frequencies, or intermediate frequencies (IF). As such, frequency translation is performed to translate the composite signal to a suitable radio frequency (RF) for transmission to a DWCD 106 (described above in relation to FIG. 1 and FIG. 3). Thereafter, the composite signal is transmitted to a DWCD 106. Subsequently, step 424 is performed where control passes to step 426 in FIG. 4B.

Figure 4B:
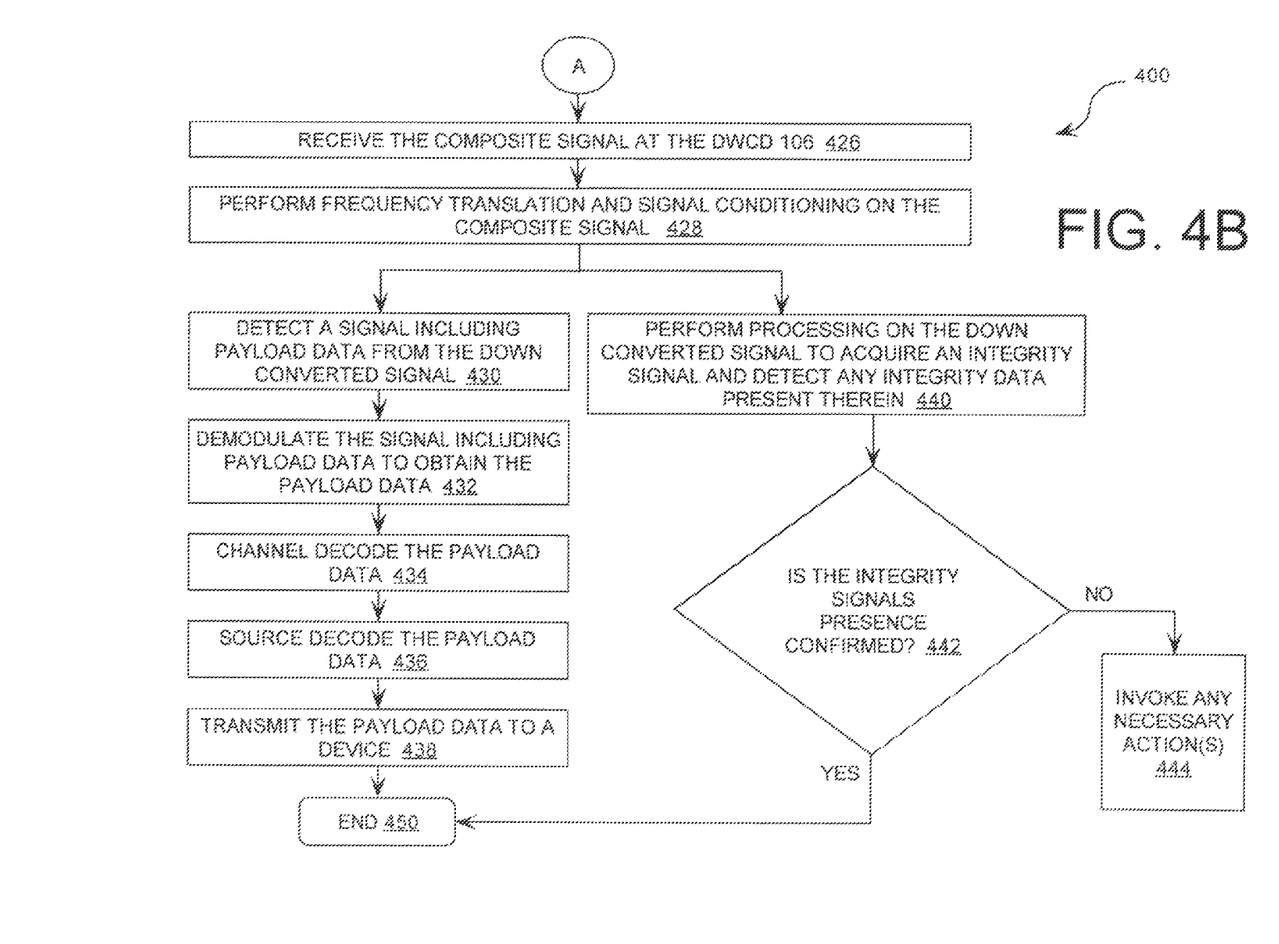

In step 426, the composite signal is received at the DWCD 106. Upon receipt of the composite signal, step 428 is performed. In step 428, the DWCD 106 performs frequency translation to translate the composite signal down to a baseband frequency, a near baseband frequency, or an intermediate frequency (IF). Also in step 428, signal conditioning is also performed on the composite signal. Such signal conditioning can involve noise removal from the composite signal, pulse shaping of the composite signal, and/or pulse clipping of the composite signal.

After step 428, control passes to step 430 and step 440. In step 430, signal processing is performed on the composite signal to detect a payload signal present within the composite signal. Subsequently, the method 400 continues with step 432. In step 432, a demodulation processing is performed on the payload signal to obtain any payload data present therein. Thereafter, control passes to step 434 where a channel decode processing is performed on the payload data. In step 438, a source decode processing is performed on the payload data. After decoding the payload data, the method 400 continues with step 438 where the payload data can be transmitted to a device (such as a memory device and/or a display device). Thereafter, step 450 is performed where the method 400 ends.

In step 440, processing is performed on the composite signal to acquire an integrity signal present in the composite signal. According to an embodiment of the invention, this step can involve identifying an integrity signal present within the composite signal and acquiring the same from the composite signal.

Step 440 also involves identifying integrity data present within the integrity signal. This identification can be accomplished by detecting a presence of a known number/symbol sequence within the integrity signal. This identification can also be accomplished by employing a demodulation process followed by a comparison of demodulated symbols under the control of a symbol timing loop once initial sequence timing has been acquired via some form of time location process.

After step 440, control passes to a decision step 442 in which a determination is made as to whether the integrity signals presence is confirmed. If the integrity signals presence is not confirmed, step 444 is performed. In step 444, any necessary actions are invoked. Such actions can include outputting a message to a user indicating that the composite signal has been tampered with by an unauthorized entity. Such actions can also include discarding any associated payload data or erasing any associated payload data from a memory device. If the integrity signals presence is confirmed, step 450 is performed where the method 400 terminates.

A person skilled in the art will appreciate that the method 400 is one embodiment of a method for detecting whether or not a transmitted signal has been tampered with by an unauthorized entity. However, the invention is not limited in this regard and any other method can be used without limitation provided that it can generate a signal including integrity data, add the signal including integrity data to a signal including payload data, and detect whether or not a transmitted signal has been tampered with by an unauthorized entity.

It should be appreciated that the method 400 can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

It should be further appreciated that the computer program code for carrying out the bypass routines and functions of the present invention can be written in an object orientated programming language such as Java®, Smalltalk, C++, or Visual Basic. However, the computer program code for carrying out the routines and functions of the present invention can also be written in conventional procedural programming languages, such as "C" programming language.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method for tamper detection of a transmitted signal, comprising:

generating a first digital data signal containing payload data and having a first data rate;

generating a second digital data signal containing an integrity code and having a second data rate;

concurrently transmitting said first digital data signal at a first carrier frequency using a first modulation format, and said second digital data signal at a second carrier frequency using a second modulation format;

selecting said second carrier frequency and a bandwidth of said second digital data signal so that said second digital data signal is contained within a frequency spectrum defined by a bandwidth of said first digital data signal;

tracking symbol timing of said first digital data signal;

using said tracked symbol timing to lock to said second digital data signal which has a symbol timing that is rationally related to and derived from said tracked symbol timing of said first digital data signal; and verifying an integrity of said first digital data signal at a remote receiver based on detection at said remote receiver of said second digital data signal, wherein said verifying step comprises identifying said integrity code within said second digital data signal; and responsive to said verifying step, automatically performing at said remote receiver actions including (1) notifying a user that tampering has occurred with respect to a composite signal comprising said first digital data signal and said second digital data signal, and (2) discarding said payload data contained in said first digital data signal.

2. The method according to claim 1, wherein said first digital data signal is combined with said second digital data signal prior to said transmission step.

3. The method according to claim 1, wherein said second digital data signal is transmitted at a second transmitter power level that is below a transmitted power level required to interfere with a demodulation level of said first digital data signal at said remote receiver.

4. The method according to claim 1, further comprising selecting a second transmitter power level, for transmitting said second digital data signal, that is at least one order of magnitude less than a first transmitter power level used for transmitting said first digital data signal.

5. The method according to claim 1, further comprising selecting said first data rate at least one order of magnitude higher as compared to said second data rate.

6. The method according to claim 1, wherein said integrity code is selected from a group consisting of pseudo-random number sequence, a chaotic sequence, and an encrypted number/symbol sequence.

7. The method according to claim 1, further comprising selecting said first modulation format to be different from said second modulation format.

8. The method according to claim 1, further comprising applying signal processing gain at said remote receiver to detect said second digital data signal contained within said bandwidth of said first digital data signal.

9. The method according to claim 8, wherein said applying said signal processing gain comprises using a signal integration time having a value that is at least one order of magnitude larger as compared to a value of said first data rate.

10. The method according to claim 1, further comprising filtering at said remote receiver a composite signal comprised of said first digital data signal and said second digital data signal to remove at least a portion of a frequency spectrum comprising said first digital data signal.

11. A system for generating a tamper-protected transmitted signal, comprising:

a first data generator configured for generating a first digital data signal containing payload data and has a first data rate;

a second data generator configured for generating a second digital data signal containing an integrity code and having a second data rate;

a transmitting device configured for concurrently transmitting said first digital data signal at a first carrier frequency using a first modulation format, and transmitting said second digital data signal at a second carrier frequency using a second modulation format, said second carrier frequency and a bandwidth of said second digital data signal contained within a frequency spectrum defined by a bandwidth of said first digital data signal; and a remote receiving device comprising at least one signal processing circuit configured for tracking symbol timing of said first digital data signal;

using said tracked symbol timing to lock to said second digital data signal which has a symbol timing that is rationally related to and derived from said tracked symbol timing of said first digital data signal; and verifying an integrity of said first digital data signal based on the detection at said remote receiver of said integrity code in the second digital data signal; and responsive to said verifying step, automatically performing at said remote receiver actions including (1) notifying a user that tampering has occurred with respect to a composite signal comprising said first digital data signal and said second digital data signal, and (2) discarding said payload data contained in said first digital data signal.

12. The system according to claim 11, wherein said transmitter transmits a composite signal which is comprised of said first digital data signal and said second digital data signal.

13. The system according to claim 11, wherein said transmitter is configured for transmitting said second digital data signal at a second transmitter power level that is below a transmitted power level required to interfere with a demodulation level of said first digital data signal at said remote receiver.

14. The system according to claim 11, wherein said second transmitter is configured for transmitting said second digital data signal at a second transmitter power level that is at least one order of magnitude less than a first transmitter power level used for transmitting said first digital data signal.

15. The system according to claim 11, wherein said first data rate is at least one order of magnitude higher as compared to said second data rate.

16. The system according to claim 11, wherein said integrity code is selected from a group consisting of a pseudo-random number sequence, a chaotic sequence, and an encrypted number/symbol sequence.

17. The system according to claim 11, wherein said first modulation format is different as compared to said second modulation format.

18. The system according to claim 11, wherein said remote receiver is configured to provide signal processing gain to detect said second digital data signal contained within said bandwidth of said first digital data signal.

19. The system according to claim 18, wherein said signal processing gain comprises an integrator circuit which utilizes an integration time having a value that is at least one order of magnitude larger as compared to a value of said first data rate.

20. The system according to claim 11, wherein said remote receiver further comprises a filter configured for filtering from a composite signal comprised of said first digital data signal and said second digital data signal at least a portion of a frequency spectrum comprising said first digital data signal.

* * * * *

UNITED STATES PATENT AND TRADEMARK OFFICE
CERTIFICATE OF CORRECTION

| | | |
|---|---|---|
| PATENT NO. | : 8,312,551 B2 | Page 1 of 1 |
| APPLICATION NO. | : 11/675120 | |
| DATED | : November 13, 2012 | |
| INVENTOR(S) | : David B. Chester | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 477 days.

Signed and Sealed this
Eleventh Day of November, 2014

Michelle K. Lee
*Deputy Director of the United States Patent and Trademark Office*